United States Patent
Cheng et al.

(10) Patent No.: US 9,996,439 B2
(45) Date of Patent: Jun. 12, 2018

(54) SELF-ERROR INJECTION TECHNIQUE FOR POINT-TO-POINT INTERCONNECT TO INCREASE TEST COVERAGE

(71) Applicant: QUALCOMM Incorporated, San Diego, CA (US)

(72) Inventors: Scott Wang-Yip Cheng, Foothill Ranch, CA (US); Raheel Khan, Tustin, CA (US); Kanwal Banga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 15/080,450

(22) Filed: Mar. 24, 2016

(65) Prior Publication Data

US 2017/0083422 A1 Mar. 23, 2017

Related U.S. Application Data

(60) Provisional application No. 62/222,726, filed on Sep. 23, 2015.

(51) Int. Cl.
| | |
|---|---|
| *G06F 11/00* | (2006.01) |
| *G06F 11/26* | (2006.01) |
| *G06F 11/263* | (2006.01) |
| *G06F 11/27* | (2006.01) |
| *H04L 1/24* | (2006.01) |

(52) U.S. Cl.
CPC .......... *G06F 11/261* (2013.01); *G06F 11/263* (2013.01); *G06F 11/27* (2013.01); *H04L 1/241* (2013.01)

(58) Field of Classification Search
USPC .......................................................... 714/28
See application file for complete search history.

(56) References Cited

U.S. PATENT DOCUMENTS

| | | | |
|---|---|---|---|
| 6,000,018 A * | 12/1999 | Packer | G11B 27/105 |
| | | | 711/118 |
| 6,373,819 B1 | 4/2002 | Lundh | |
| 7,137,048 B2 | 11/2006 | Zerbe et al. | |
| 8,026,726 B2 | 9/2011 | Sul et al. | |
| 8,386,867 B2 | 2/2013 | Sul et al. | |
| 8,694,276 B2 | 4/2014 | Sontakke et al. | |
| 2004/0141563 A1* | 7/2004 | Gersemsky | G06F 13/4286 |
| | | | 375/259 |
| 2004/0225932 A1 | 11/2004 | Hoda et al. | |

(Continued)

OTHER PUBLICATIONS

International Search Report and Written Opinion—PCT/US2016/051092—ISA/EPO—dated Dec. 7, 2016.

*Primary Examiner* — Sarai E Butler
(74) *Attorney, Agent, or Firm* — Loza & Loza, LLP/Qualcomm (57) ABSTRACT

Various aspects describe an on-chip, hardware error-generator component. In some cases, the hardware error-generator component connects to a data path between two components contained within a same chip. Upon receiving an error simulation input, the hardware error-generator component modifies data being transmitted on the data path by inserting a data pattern that simulates an error condition. Alternately or additionally, the hardware error-generator randomly alters one or more of the transmitted data bits.

29 Claims, 6 Drawing Sheets

(56) References Cited

U.S. PATENT DOCUMENTS

| | | | |
|---|---|---|---|
| 2005/0262402 A1* | 11/2005 | Ballester | H04L 1/241 |
| | | | 714/704 |
| 2011/0161747 A1 | 6/2011 | Yamazaki | |
| 2012/0233514 A1 | 9/2012 | Patil et al. | |
| 2014/0143588 A1* | 5/2014 | Leinonen | G06F 11/0742 |
| | | | 714/2 |
| 2014/0223270 A1 | 8/2014 | Gauvin et al. | |
| 2015/0012774 A1* | 1/2015 | Maeda | G06F 11/0724 |
| | | | 714/5.1 |
| 2016/0077907 A1* | 3/2016 | Tsuji | H04L 41/0686 |
| | | | 714/37 |

* cited by examiner

SELF-ERROR INJECTION TECHNIQUE FOR POINT-TO-POINT INTERCONNECT TO INCREASE TEST COVERAGE

RELATED APPLICATIONS

This application claims priority to U.S. Provisional Patent Application No. 62/222,726, filed Sep. 23, 2015, the disclosure of which is incorporated by reference herein in its entirety.

BACKGROUND

Field of the Disclosure

This disclosure relates generally to error-injection control and, more specifically, to on-chip error-generator components.

Description of Related Art

Computing devices today conventionally include multiple components that are interconnected with one another through data lines. Each component performs a respective functionality and interconnects with one another to request or share results. Thus, data lines are used by the components to communicate data or information back and forth to achieve an overall goal. Ideally, data lines successfully transmit and receive data without error. However, in a real-world implementation, physical properties introduce error into the data lines, corrupting the data being transferred. Since real-world effects cannot be eradicated completely, a viable alternative ensures that errors are handled properly. Since errors can manifest in a variety of ways, it can be challenging, especially in multiple-component devices, to ensure that all possible errors are handled properly. This is due to the limited number of interfaces available to test a multi-component device.

SUMMARY

This Summary is provided to introduce a selection of concepts in a simplified form that are further described below in the Detailed Description. This Summary is not intended to identify key features or essential features of the claimed subject matter.

One aspect of the disclosure describes a device for testing error handling, the device comprising: at least one error insertion circuit; an on-chip hardware error-generator component coupled, via the at least one error insertion circuit, to at least one data line between two sub-components in the device, the on-chip hardware error-generator component configured to: receive an error simulation input; determine a data error pattern based, at least in part, on the error simulation input; and insert the data error pattern, via the at least one error insertion circuit, on the at least one data line effective to generate an error condition.

One aspect of the disclosure describes a method for testing error handling, the method comprising: receiving, using a hardware error-generator component, an error simulation input; determining, using the hardware error-generator component, a data error pattern to insert on at least one digital data line coupled to the hardware error-generator component; and inserting, using the hardware error-generator component, the data error pattern on the at least one digital data line effective to generate an error condition.

One aspect of the disclosure describes an apparatus for testing error handling, the apparatus comprising: an on-chip sub-component of the apparatus operatively coupled to a data path; and an on-chip hardware error-generator component operatively coupled to the data path and comprising: means for receiving error simulation input; means for determining at least one data error pattern based, at least in part, on the error simulation input; and means for inserting the at least one data error pattern on the data path effective to generate an error condition into the on-chip sub-component of the apparatus.

One aspect of the disclosure describes one or more computer-readable memory devices comprising processor-executable instructions which, responsive to execution by at least one processor, perform operations to simulate on-chip error generation using one or more components of an emulated integrated circuit (IC), the operations comprising: receiving an error simulation input at an on-chip hardware error-generator component of the emulated IC; determining a data error pattern based, at least in part, on the error simulation input; and inserting the data error pattern on at least one data line coupled to the on-chip hardware error-generator effective to generate an error condition into a sub-component of the emulated IC that is coupled to the at least one data line.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

To ensure robust products, error handling functionality can be added to account for possible error conditions, such as errors caused by data corruption or loss of data. Consider an example where interconnected components in a wireless modem share data with one another over digital data lines. In one possible error scenario, a receiving component expects to receive a first set of data, but instead receives a second set of data that includes corrupted data. Instead of hanging or halting the actions of the receiving component due to corrupted data (or the overall functionality of the wireless modem itself), error handling functionality can be used to identify when corrupted data has been received. Upon identifying corrupted data, error handling functionality generates or executes a response to handle the error, such as by returning information to the sending component indicating that corrupted data has been received, using bit recovery techniques as an attempt to recover the corrupted data, and so forth. By including error handling functionality, a component will still yield reliable results, even when presented with corrupted data, thus preventing the overall functionality from hanging. In turn, this yields a more robust product. However, even the error handling can be prone to errors. Thus, a product is only as robust as its associated error handling, and it is desirable to verify that the error handling works as expected.

Testing a complex product for errors, and proper error handling, poses certain challenges. Consider the example of an integrated circuit (IC) that includes multiple sub-components interconnected through data lines. ICs have finite inputs and outputs used to access the IC which, in turn, can be used to test overall functionality of an IC. "Black-box" testing of an IC inputs known data through the corresponding input, and monitors the outputs for expected results. Here, the inner workings of the IC are not exposed. If the IC exhibits faulty behavior by returning unexpected results, it can be problematic identifying where in the interconnected sub-components problems originate. Further, the nature of "black-box" testing can make it difficult to guarantee that all error cases have been exercised or tested, particularly those referred to as "corner cases". Corner cases can vary from system to system but conventionally include those cases that occur infrequently.

To ensure a wide variety of test coverage scenarios, including so-called "corner cases", on-chip, hardware error-generator components are utilized to accurately control error injection and the timing thereof. The hardware error-generator components provide for flexibility and expandability to allow for testing to be performed in the pre-silicon platform and post-silicon platform, as well as customer sample systems. In at least one aspect, the hardware error-generator component is a component on an IC, such as a silicon chip. The hardware error-generator component can connect to a data path between two sub-components contained within the chip and, upon receiving an error simulation input, modify data being transmitted on the data path. In some cases, the data is modified randomly, while in other cases, a known data pattern is selected based upon the error simulation input. The data pattern is then inserted on the data path effective to generate an error condition. Another error simulation input can be used to return the data path back to its original transmission state (e.g., unaltered).

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
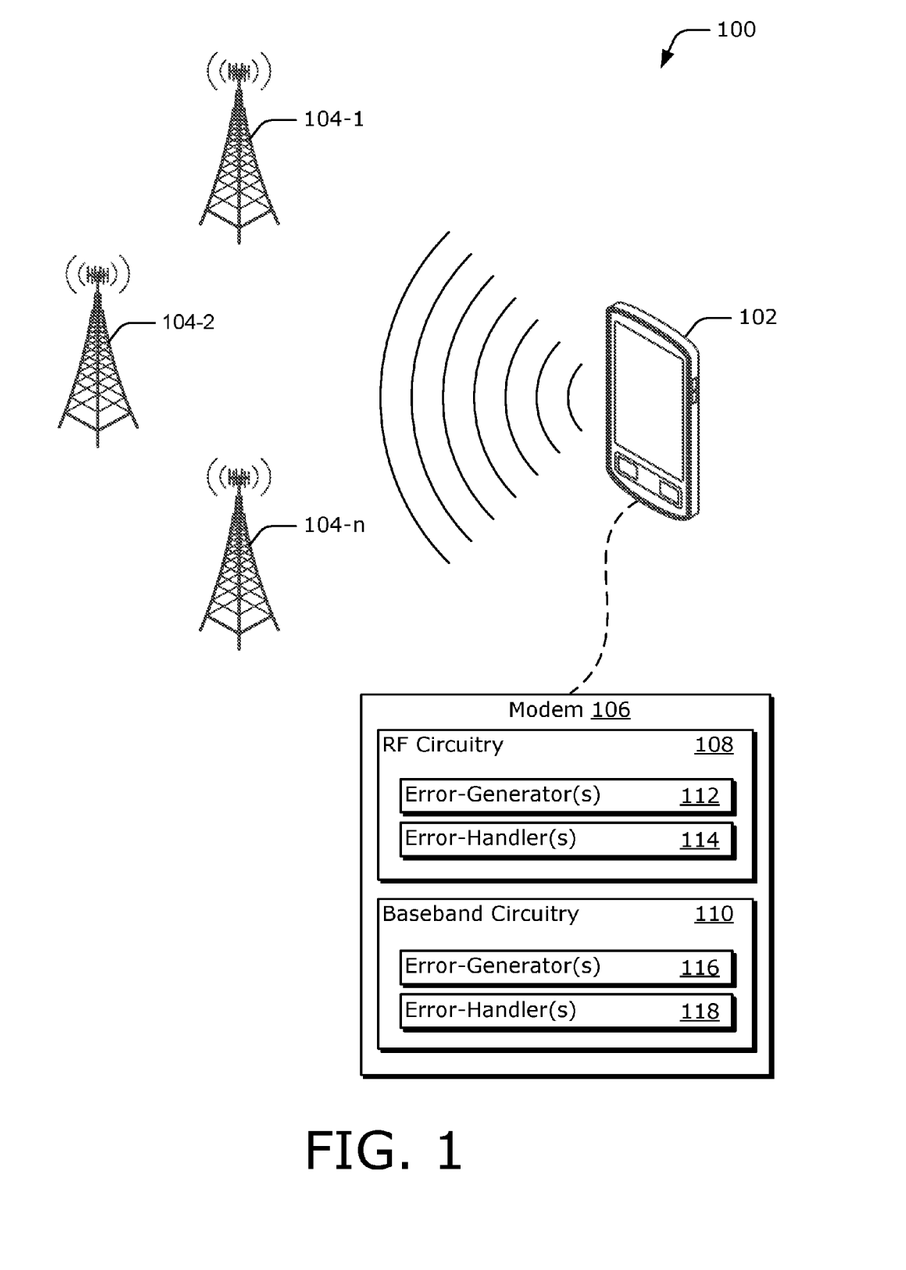
FIG. 1 is an illustration of an example environment in which hardware, error-generator components can be employed.

FIG. 1 illustrates example environment 100 comprising user device 102. Here, user device 102 is shown as a cellular mobile device, but any suitable type of computing device, such as a tablet, laptop computer, a set-top box, satellite receiver, cable television receiver, Wi-Fi access point, desktop computer, gaming device, display device, or the like can be used. In this example, user device 102 includes wireless communication capabilities, and is configured to communicate with any or all of cell towers 104-1 through 104-n, where "n" represents an arbitrary number. These cell towers work in conjunction to communicate with user device 102 and allow user device 102 to move from location to location without losing a communication link. Here, user device 102 includes modem 106 to perform at least part of these communications.

Modem 106 transmits and receives wireless signals and/or data. In some aspects, modem 106 is a circuit board that electrically connects various electronic components to achieve a desired functionality. Some circuit boards use multiple layers to connect components and route signals. Components on a circuit board can range from simple electrical components (e.g. resistors, capacitors, etc.), to more complex components (e.g. ICs, system-on-chip (SoC), etc.). Among other things, a SoC is an integrated circuit that includes multiple components which work together to perform the functionality of a system. Various tasks within the system can be partitioned into smaller tasks, each of which may be performed a respective sub-component of the SoC. These sub-components communicate with one another to achieve the overall system functionality. Here, modem 106 includes two complex components: Radio Frequency (RF) circuitry 108 and baseband circuitry 110. For simplicity's sake, the discussion of modem 106 will be reserved to these components. However, modem 106 can include additional or alternate components, hardware, software and/or firmware without departing from the scope of the claimed subject matter. In some aspects, RF circuitry 108 and/or baseband circuitry can be implemented as an IC and/or SoC.

RF circuitry 108 sends and receives wireless signals and/or data over a wireless communication link via one or more antenna, while baseband circuitry 110 performs real-time baseband processing of the wireless signals and/or data. To actualize wireless communication capabilities of modem 106, RF circuitry 108 and baseband circuitry 110 interconnect with one another to exchange data. As further described above and below, these interconnections can be susceptible to real-world influences that corrupt data as it is being transferred. In order to ensure robust handling of corrupted data, RF circuitry 108 includes error-generator(s) 112 and error-handler(s) 114. Similarly, baseband circuitry 110 includes error-generator(s) 116 and error-handler(s) 118. While FIG. 1 illustrates RF circuitry 108 and baseband circuitry 110 as each only including one error-generator and one error-handler, it is to be appreciated that this is merely for discussion purposes. That is, any suitable number of error-generator components and/or error-handler components can be included on RF circuitry 108 and baseband circuitry 110 without departing from the scope of the claimed subject matter.

Error-generator(s) 112 and error-generator(s) 116 represent on-chip hardware error-generator components that introduce a data error pattern onto a data line connecting at least two sub-components, as further described below. Among other things, error-generator components override data transmissions coming in from a first (originating) sub-component on a respective data path, and output a specified data error pattern on the data path into a second (recipient) sub-component. Dynamic configurations and/or alterations to an error-generator component can control the timing of when a data error pattern is placed onto a data line and/or the content of the data error pattern.

Error-handler(s) 114 and error-handler(s) 118 represent on-chip error-hander components that receive input data, and perform a known response to the received data. For example, an error-handler component can be "downstream" of a data line that is coupled to an error-generator component, where the error-handler component receives either direct data input generated by the error-generator component or indirect data input generated by the error-generator component. When the received data includes an error, an error-handler component recognizes the "corrupted data", and handles it in such a manner that prevents the corresponding system from hanging and/or halting (e.g. the corresponding system can recover from the corrupted data).

Having described example operating environments in which various aspects can be utilized, consider now a discussion of self-error injection in point-to-point connections in accordance with one or more aspects.

Self-Error Injection in Point-to-Point Connections

The complexity of a device sometimes translates into an increase in the number of hardware and/or software components contained within the device. At times, various functions performed by the device can be partitioned and executed by respective components. In turn, the components communicate with one another to request functionality, return results, indicate when an event has occurred, and so forth, to realize an overall objective. In hardware, communications can occur over data lines by transmitting electronic signal(s) with various waveforms and/or patterns to represent information or data.

Figure 2:
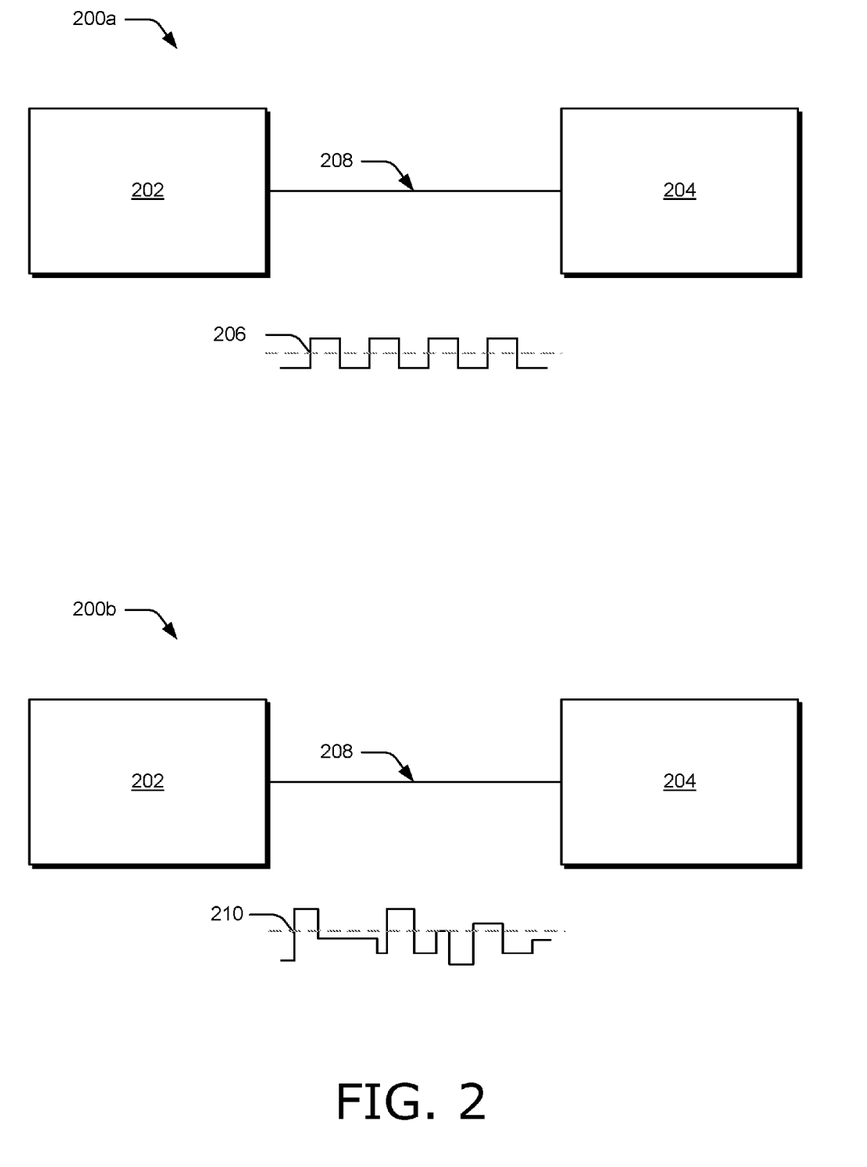
FIG. 2 is an illustration of example ideal and distorted data signals.

To further illustrate, consider FIG. 2, which includes examples 200a and 200b. Example 200a illustrates a component 202 and a component 204 communicating with one another via electronic signal 206 over data line 208. Here, electronic signal 206 represents an ideal electronic signal flowing on data line 208 between the respective components. Since the electronic signal is ideal, it is received by component 204 exactly as sent by component 202. Any suitable type of electronic signal can be sent between the components to represent any suitable type of information. For simplicity's sake, data line 208 between component 202 and component 204 is illustrated as a single data line connection with a single electronic signal flowing between the two. However, data line 208 can include multiple data line connections, each with a respective electronic signal, without departing from the scope of the claimed subject matter. In a digital link, electronic signals are transmitted to convey digital information. Upon receiving electronic signal 206, component 204 extracts the information in a manner as agreed upon between the components, such as by comparing the voltage of electronic signal 206 to a threshold value at instantaneous points in time to discern if the corresponding data bit is a "0" or a "1". This simple example is for discussion purposes only. As such, other suitable types of electronic signals and/or information extraction processes can be used without departing from the scope of the claimed subject matter. When an electronic signal is sent cleanly, such as the ideal signal flow of electronic signal 206, component 204 receives all of the data transmitted by component 202 without errors. In a real world environment, however, various factors can distort a signal and, in turn, corrupt the data that is being sent.

Example 200b illustrates component 202 and component 204 communicating over data line 208 via electronic signal 210, where electronic signal 210 includes distortions based upon physical factors. Here, physical factors, such as electromagnetic interference (EMI), noise, imperfect data line materials, temperature fluctuations, etc., can modify physical properties of the signal, such as a resultant voltage. In turn, when component 204 makes a decision as to whether the information is a "0" or a "1", the alterations made to the ideal signal can yield incorrect data (e.g., a transmitted "1" is interpreted as a "0"). Thus, even though a first component sends the correct information, the second component may not receive the information properly due to distortion.

An on-chip, hardware error-generator component can be used to simulate various error conditions, such as those associated with corrupted data, between sub-components of a system. In turn, the data error simulations can be used to test error handling functionality of the receiving sub-components. Having precise control of what error conditions are simulated, and when they are simulated, ensures a more robust product by exercising the respective error handling functionality.

Figure 3A:
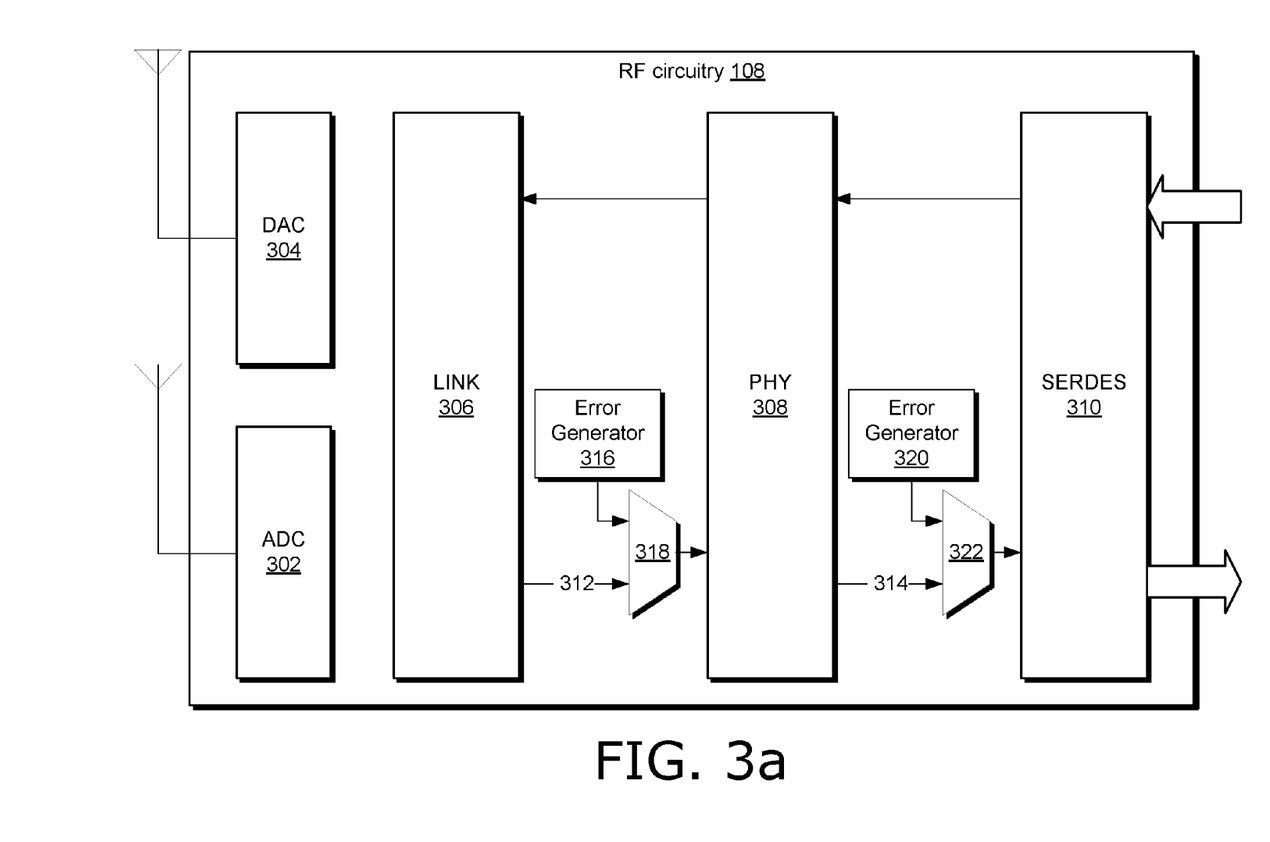
FIGS. 3a and 3b are illustrations of system-on-chip circuits in which hardware, error-generator components are employed to test error handling functionality.
Figure 3B:
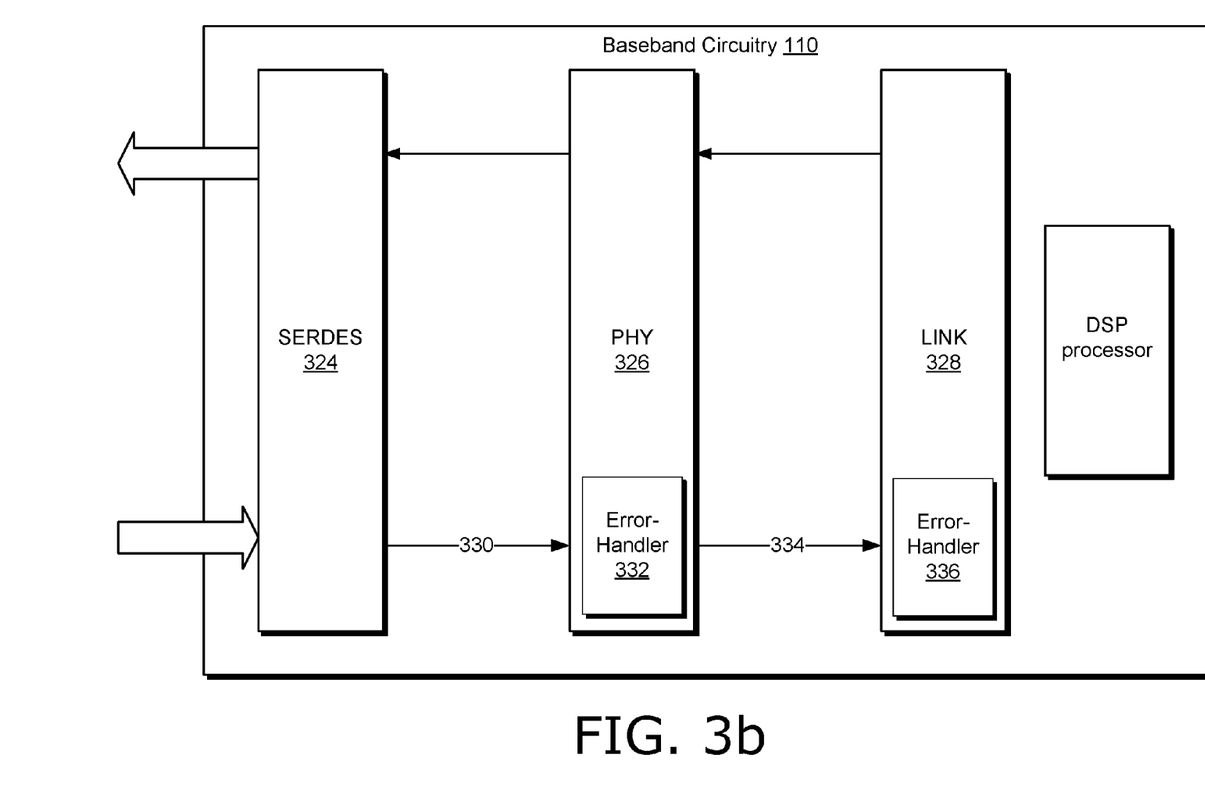

Continuing on with the above example of a wireless modem, now consider FIGS. 3a and 3b. FIGS. 3a and 3b include more detailed example implementations of RF circuitry 108 and baseband circuitry 110 of FIG. 1, respectively. As in the above case, the discussion of these examples will be reserved to the illustrated components. It is to be appreciated that other aspects can incorporate additional or less functionality/circuitry without departing from the scope of the claimed subject matter.

In this example, RF circuitry 108 is implemented as a SoC. The sub-components of RF circuitry 108 include: analog-to-digital converter (ADC) 302, digital-to-analog converter (DAC) 304, link layer sub-component 306, physical (PHY) layer sub-component 308, and SERDES sub-component 310. Generally speaking, ADC 302 receives an incoming RF signal from a respective antenna, and generates digital samples from the signal. DAC 304 receives digital samples, converts the samples to an analog signal, and transmits the analog signal out a respective antenna. Link layer sub-component 306 contains logic that is used to interconnect RF circuitry 108 to other components using communication protocols, while PHY layer sub-component 308 represents functionality that configures hardware to generate data signals associated with the communication protocol(s) managed by link layer sub-component 306. SERDES sub-component 310 represents an ability to send and receive data off-chip. Among other things, SERDES sub-component 310 includes logic that converts data transmissions between serial and parallel formats.

To help maintain the interconnections between RF circuitry 108 and external or internal components, link layer sub-component 306 sends data to PHY layer sub-component 308 using data line 312. Similarly, PHY layer sub-component 308 sends data to SERDES sub-component 310 using data line 314. Data line 312 and data line 314 can be digital links used to transfer digital information between the different components. As discussed above, the electronic signals used to transfer the information over data line 312 and data line 314 are subject to modification due to physical factors. Consequently, there is a potential that components downstream from link layer sub-component 306 or PHY layer sub-component 308 may receive corrupted data. By inserting error-handler components into the system, the downstream components can respond to the corrupted data without jeopardizing operation of the overall system. However, it is helpful to further test the error handling to ensure that it is working properly. Some aspects insert data error patterns onto these data paths using on-chip hardware error-generator components as a way to generate each potential data corruption scenario on command.

RF circuitry 108 includes error-generator component 316, which is coupled to data path 312 via an error insertion circuit in the form of a hardware multiplexer (MUX) 318, and error-generator component 320, which is coupled to data path 314 via error insertion circuit in the form of a MUX 322. While the error insertion circuits are each illustrated here as a MUX, it is to be appreciated that other types of circuits, control logic components, gates, and/or hardware can be utilized without departing from the scope of the claimed subject matter (i.e., an arithmetic logic unit (ALU), an eXclusive OR (XOR) gate, AND gates, OR gates, inverter (NOT) gates, etc.). The coupling of an error-generator component to a data line via insertion circuitry and/or control logic yields configurable hardware components that can override data transmissions on a respective data path, and additionally allow data transmissions to travel along their respective data path unaltered. In terms of this example, data transmitted on data path 312 can pass through MUX 318 without modification when error-generator component 316 is disabled, or can be altered with a data error pattern when error-generator component 316 is enabled. Similarly, data transmitted on data path 314 can pass through MUX 322 without modification, or can be altered with a data error pattern generated by error-generator component 320. Thus, data transmissions can be modified according to a variety of selected data error patterns, and in a variety of manners, as further described below. Further, data modifications generated by an error-generator component can replace a portion of the original transmitted data, can be interspersed with the original transmitted data, or can replace all of the original transmitted data. The resultant data is then transmitted "downstream" for further processing. Here, the cumulative effect of either one or both of error-generator component 316 and error-generator component 320 is sent out through SERDES sub-component 310 to a recipient, such as baseband circuitry 110. It is to be appreciated that, when multiple error-generator components reside on a same chip, the error-generator components can be enabled at a same time, or independent of one another.

FIG. 3b. illustrates an example implementation of baseband circuitry 110 that connects into RF circuitry 108 of FIG. 3a. As in the case of RF circuitry 108, baseband circuitry 110 is illustrated as a SoC with similar sub-components (e.g., SERDES sub-component 324, PHY layer sub-component 326 and link layer sub-component 328). Incoming (off-chip) data is received through SERDES sub-component 324, and forwarded to PHY layer sub-component 326 over data line 330. Among other things, the data received over data line 330 is passed to error-handler component 332 for processing. Error-handler component 332 represents on-chip error handling functionality that resides in PHY layer sub-component 326 and is configured to process incoming data in a context pertains to PHY layer functionality (e.g., recognizes and/or processes data in a format associated with PHY layer functionality). Similarly, link layer of sub-component 328 receives data over data line 334, which is then processed by on-chip error-handler component 336. Both the error-handler component 332 and error-handler component 336 can be considered "downstream" from error-generator component 316 and error-generator component 320 since each error handler component (indirectly) receives data generated by, or based upon, the error-generator components. Thus, the error handling functionality of baseband circuitry 110 can be tested by inserting data error patterns "upstream".

In this example, each error-handler component of baseband circuitry 110 is an intended recipient of one or more data error simulations generated by any combination of error-generator component 316 and/or error-generator component 320. As in the cases of the error-generator components, the error-handler components can be placed in any suitable location and/or on any suitable sub-component of baseband circuitry 110. By cycling through various data error simulation scenarios, the on-chip error-hander components of baseband circuitry 110 can be tested to ensure a robust product. It is to be appreciated that, while the above discussion uses the context of error-generator components placed on-chip on RF circuitry 108 for testing purposes of error-handler components on baseband circuitry 110, the various techniques described are applicable to other aspects. For example, in some cases, baseband circuitry 110 includes one or more on-chip error-generator components throughout an outgoing data path towards RF circuitry 108. Similarly, RF circuitry 108 can include one or more error handler components on its respective sub-components.

By inserting a hardware error-generator component along a data path, testing routines are able to more precisely control which error conditions occur and when the error conditions occur. In some cases, the data patterns generated by a hardware error-generator component can be tailored to the type of data being transmitted via the data path on which the patterns are inserted. Consider error-generator component 316, which is inserted between link layer sub-component 306 and PHY layer sub-component 308. In some aspects, link layer sub-component 306 and PHY layer sub-component 308 communicate with one another using structured data packets. Among other things, structured data packets have a pre-agreed upon data partitioning between the communicating parties. For example, some data packets begin with a preamble or training sequence, include a synchronization word, a checksum for error checking, a data packet header, message type fields, identification fields, payload data, a cyclic redundancy check (CRC) field, and so forth. Based on the pre-agreed upon structure, the transmitting and receiving entities interpret certain groupings of data to have different meanings. Accordingly, in some aspects, error-generator component 316 tracks the phase of a data packet as it is being transmitted (e.g., keeps track of which phase and/or field of a structured data packet is currently being transmitted over a data line) and inserts data error simulation in a particular location within the data packet. Any suitable field can be tracked and/or modified, such as a data packet header modification, a CRC field error, payload data errors, a forced error bit on a data lane, and so forth. In some cases, an error-generator component includes a state machine to track the phase of a data packet as it is being transmitted to identify the current fields.

While data error simulations can be based upon altering specific fields of a structured data packet, they can also be timing-based. For instance, instead of tracking the phase of the data that is being transferred between components, it may be desirable to instead insert errors at periodic time intervals, over specified interval windows, and/or random intervals. These intervals can be based upon any suitable time and/or unit of measure, such as a clock count, a bit count, a specified window of time, and so forth. When an identified interval occurs, the error-generator component inserts data onto the data line to simulate specified error conditions, such as a stuck-high bit, a stuck-low bit, a random bit pattern, a random bit flip, a bit-shift, and so forth.

In addition to inserting data error simulations at random points in time, some aspects insert random errors. For instance, when modifying a checksum value of a data packet as further discussed above, the data error simulation can be based upon the currently transmitted checksum value. However, in other aspects, the data can simply be randomly altered, such as through random bit-flipping, either at specific points in time, or at random points in time, specified error conditions at specified points in time, or any combination thereof. Thus, an error-generator can be configured to simulate phase (e.g. data field) level errors, timing level errors, random errors, or any combination thereof.

By having precise control of data error simulation on a data line, a product can be tested more thoroughly for a number of scenarios, including corner case scenarios. The precise generation of an error allows an observer to verify whether the error is handled properly by the receiving component. Further, the on-chip nature of the error-generator components, as well as the error-handler components discussed above, allow for verification of behavior during simulation and emulation of a silicon chip design during the pre-silicon/prefabrication process. For example, an on-chip configuration register can be used throughout the various development phases to configure an error-generator component.

On-chip configuration registers of ICs and/or SoCs can be used to control the behavior of various on-chip components, such an on-chip hardware error-generator component. For instance, different input values to a configuration register can alter how and/or when the error-generator component inserts data error simulations on to a corresponding data path. This can be achieved in any suitable manner, such as by enabling or disabling a data error simulation state machine in the error-generator component that monitors a phase of data being transmitted effective to identify various data fields. The data input can also be used to configure the timing of when data errors are simulated, whether the data is random in nature, etc. Thus, different configurations of an error-generator component correspond to different data being written into a configuration register. There can be a 1-to-1 correspondence between an error-generator component and a configuration register (where each on-chip error-generator component has a respective configuration register), or there can be a 1-to-many correspondence (where a master configuration register is used to configure multiple error-generator components, or multiple configuration registers are used to configure one error-generator component). Regardless, the behavior of an error-generator component can be modified, enabled, or disabled by writing the corresponding configuration data or commands into the proper register. The on-chip nature of these configuration registers give a developer uniform access to an error-generator component, regardless of where in development the error-generator component is being accessed.

One advantage of on-chip error-generator components is the ability to precisely test various error scenarios, and corresponding error handling techniques, throughout various phases of the development cycle using existing development tools. In some cases, the same test sequences can be used. The on-chip nature of the error-generator components, as well as the error-handler components discussed above, allow for verification of behavior during simulation and emulation of a silicon chip design during the pre-silicon/prefabrication process. For example, in the pre-fabrication development stage of an IC, the error-generator component configuration registers can be accessed and/or set using test scripts run in conjunction with emulation software that simulates the IC and/or various components of the IC (e.g., emulation of an on-chip hardware error-generator, emulation of one or more sub-components of the IC, emulation of error-handler components of the IC, etc.). This allows for pre-fabrication testing of not only the on-chip hardware error-generator components of an emulated IC, but the corresponding error-handler components as well. These same testing routines can also be utilized post-fabrication to assess the hardware aspects of the configuration registers and/or the error-generator components, as well as when the IC is included into a design or product. Thus, a multitude of platforms can use at least some of the same testing procedures that employ on-chip error-generator components.

Figure 4:
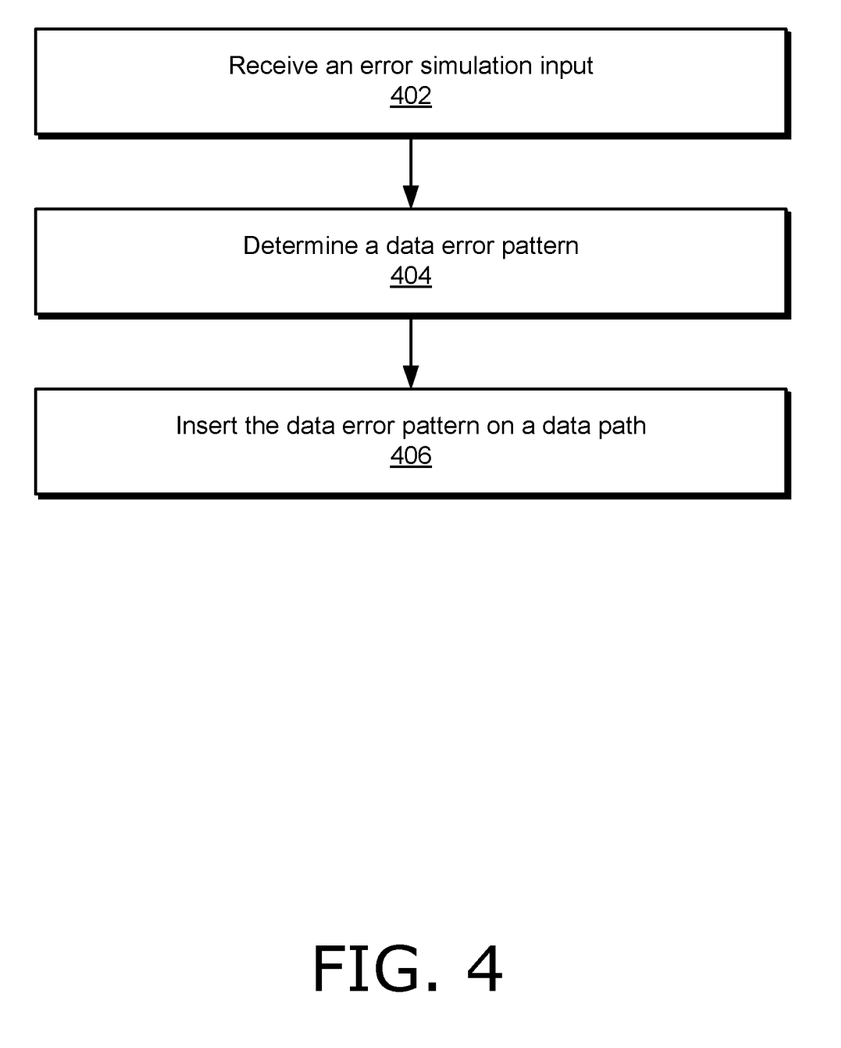
FIG. 4 is a flow diagram that describes a method that employs hardware error-generator components.

FIG. 4 illustrates an example method in accordance with one or more aspects. This method can be performed by hardware, firmware, software, or any suitable combination thereof. In some aspects, the method can be implemented in hardware via one or more sub-components on a system-on-chip, as further described below above and below.

At block 402, an error-generator component receives an error simulation input. The error simulation input can be received in any suitable manner. For example, in some cases, the error simulation input is received via a register write to a configuration register associated with the error-generator component. At times, the error-generator component is a sub-component of an IC. The error simulation input can be any suitable type of input, such as data over one or more data lines, data bits stored at one or more addresses in computer-readable memory hardware, and so forth. Alternately or additionally, the error-generator component can receive an event, such as hardware or software interrupt, indicating that data error simulation input is available.

At block 404, responsive to receiving the error simulation input, the error-generator component determines a data error pattern. At times, the data error pattern is a modification to binary "0" or "1" bits, such as a random flip of a bit. Another example of a data error pattern is a modification to particular field in a data packet. Any suitable type of data error pattern can be determined, such as a data pattern simulating a stuck-high bit, a data pattern simulating a stuck-low bit, a data pattern simulating a random-bit flip, a data pattern simulating a forced error bit on the data line, a data pattern simulating a CRC field error, a data pattern simulating a data packet header error, a data pattern simulating a training sequence data error, and so forth.

Alternately or additionally, the error-generator component can determine timing insertion information from the error simulation input, such as: an indication to periodically insert a data error pattern on the data line, an indication to randomly insert a data error pattern on the data line, an indication of a count metric for a number data error patterns to insert, an indication of a timing window in which to insert data error patterns, and so forth. In some cases, the selection of a data error pattern is performed by one or more logic gates in hardware.

At block 406, responsive to selecting a data error pattern, the error-generator inserts the data error pattern on a data path. For example, as described above and below, the error-generator component can be coupled to one or more error insertion circuit that manages a digital data line. When the error insertion circuit and the error-generator component are enabled, an electronic signal traveling on a digital data line can be modified to simulate the selected data error pattern. In some aspects, a hardware error-generator component tracks a phase of a structured data packet being transmitted on a data line, and inserts the data error pattern in at least one field of the structured data packet, such as a training field that is used by a receiver to detect a packet or tune to a signal, a data packet header, etc. Inserting the data error pattern can be based on timing data, such as a clock count at random or periodic intervals. The data error pattern can be interspersed with data originating from a first sub-component to a second sub-component via a digital data line, such as by replacing a portion of the data originating from the first sub-component on the digital data line, or can replace all of the data originating from the first sub-component on the digital data line.

Thus, on-chip, hardware error-generator components provide a low cost testing solution with controllable outcomes since the error-generator components are fabricated in a same manner as the functionality being testing. The predictable control of simulating data errors allows for thorough testing of error handling functionality in multiple platforms without a need for additional hardware or testing equipment. Having described various embodiments of on-chip, hardware error-generator components, consider now an example system that can be utilized to implement one or more of the above-described embodiments.

Example System and Device

Figure 5:
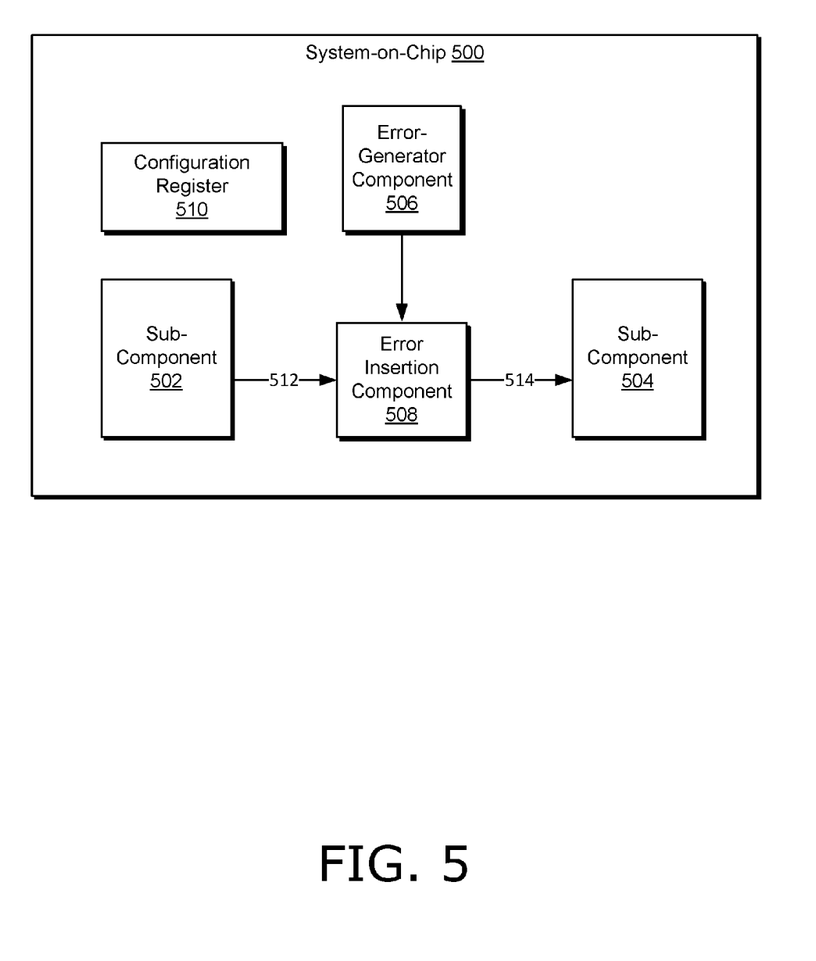
FIG. 5 is an example system which illustrates on-chip, sub-component interconnections that employ hardware, error-generator components for testing purposes.

FIG. 5 illustrates an example system-on-chip (SoC) 500, which includes components capable of implementing aspects of self-error injection via hardware error-generator components. In some aspects, system-on-a-chip 500 is an IC comprising a set of electronic circuits on one or more substrate of semiconductor material, such as silicon, germanium, gallium arsenide, and so forth. Further, system-on-chip 500 may be implemented in, or as, any suitable electronic device, such as a modem, broadband router, access point, cellular phone, smart-phone, gaming device, laptop computer, net book, smart-phone, network-attached storage (NAS) device, or any other device that may implement self error-injection. System-on-chip 500 can be configured to perform any suitable type of functionality. For example, in some aspects, system-on-chip 500 implements an RF signal processing system, such as RF circuitry 108 of FIG. 1. Alternately or additionally, system-on-chip 500 implements a baseband signal processing system functionality, such as that provided by baseband circuitry 110 of FIG. 1.

System-on-chip 500 includes sub-component 502 and sub-component 504. These sub-components are used to generally represent partitioned functionality contained within system-on-chip 500. In some cases, the sub-components are partitioned circuits that included varying combinations of transistors, logic gates, flip flops, MUX-es, computer-readable memory storage, and so forth, to perform their respective partitioned functionality. At times, the sub-components are configured to include circuitry capable of processing analog and/or digital signals. For example, in some aspects, sub-component 502 performs link layer functionality, such as that performed by link layer sub-component 306 of FIGS. 3a and 3b. Alternately or additionally, sub-component 504 performs PHY layer functionality, such as that performed by PHY layer 308 of FIGS. 3a and 3b.

System-on-chip 500 also includes error-generator component 506, error insertion component 508, and configuration register 510, which can be used together to inject one or more data error simulations on the data lines coupling sub-component 502 and sub-component 504. In some aspects, the functionality of error-generator component 506 and/or error insertion component 508 can be controlled by writing data into configuration register 510. For example, error-generator component 506 and/or error insertion component 508 can receive configuration data through preassigned addresses accessible through configuration register 510. In some embodiments, the data input to configuration register 510 enables or disables a data error simulation state machine in error-generator component 506 that monitors a phase and/or a state of data being modified, and/or configure the timing of when data errors are simulated, as further described above. For simplicity's sake, system-on-chip 500 is illustrated as containing one error-generator component, one coupling logic component, and one configuration register. However, system-on-chip 500 can include any suitable combination in number of these components and registers without departing from the scope of the claimed subject matter.

Data line 512 represents a digital data line that can be used by sub-component 502 to transmit data and/or information, via an electronic signal, to sub-component 504. Here, data line 512 is an input to error insertion component 508, while data line 514 is an output digital data line from the error insertion component 508. When error-generator component 506 is disabled (e.g., not generating data error simulations), the data transmitting on data line 512 passes through error insertion component 508 to sub-component 504 by way of data line 514. When error-generator component 506 is enabled (e.g., simulating data errors), error insertion component 508 injects the simulated errors onto data line 514. In some embodiments, all of the data transmitted on data line 512 is replaced (such as a whole data packet), while in other embodiments, data errors are interspersed with the data transmitted on data line 514 at various locations and/or point in time. Thus, error insertion component 508 contains circuitry and/or logic that couples data line 512 with error-generator component 506 to output resultant data signals over data line 514. Error insertion component 508 can be implemented in any suitable manner, such as through the use of a MUX, an XOR logic gate, and so forth.

Various techniques may be described herein in the general context of hardware components, software components, firmware components, or any combination thereof. Generally, hardware components can include interconnected electronic components that perform analog and/or digital operations based upon input electronic signals and/or power. The interconnected electronic components can range widely, such as, for example, discrete components (e.g., resisters, capacitors, transistors, etc.), integrated circuits (ICs), semiconductor based components, optically based components, central processing units (CPUs), Input/Output (I/O) ports, computer-readable memory devices, or any combination thereof. Alternately or additionally, the electronic components can be any combination of passive or active electronic components. These examples are merely for discussion purposes, and are not intended to limit the scope of the claimed subject matter.

Generally, software components includes routines, programs, objects, data structures, and so forth that perform particular tasks or implement particular abstract data types. The tasks performed by the software components can range from low-level hardware access, such as processor-executable instructions that perform register reads and writes, to operating system components that manage access to computer hardware and provide common services and/or programs, to application components that utilize services provided by an operating system to interact with a user. These various components and techniques may be stored on or transmitted across some form of computer readable media, and are, at times, executable by one or more processors.

"Computer-readable storage media" and/or computer-readable memory devices include volatile and non-volatile, removable and non-removable media implemented in any method or technology for storage of information. Further, the contents contained within the media and/or memory devices can be accessed by a computer or processor. Storage media and/or memory devices can be implemented by any suitable type of device, such as, by way of example, and not of limitation, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. The information can include any suitable type of data, such as computer readable instructions, sampled signal values, data structures, program components, or other data. These examples, and any combination of storage media and/or memory devices, are intended to fit within the scope of non-transitory computer-readable media.

Firmware components include electronic components with programmable memory configured to store executable instructions that direct the electronic component how to operate. In some cases, the executable instructions stored on the electronic component are permanent, while in other cases, the executable instructions can be updated and/or altered. At times, firmware components can be used in combination with hardware components and/or software components.

The term "component", "module", and "system" are intended to refer to one or more computer related entities, such as hardware, firmware, software, or any combination thereof, as further described above. One or more components. At times, a component may refer to a process and/or thread of execution that is defined by processor-executable instructions. Alternately or additionally, a component may refer to various electronic and/or hardware entities.

Conclusion

Various aspects describe an on-chip, hardware error-generator component. In some cases, the hardware error-generator component connects to a data path between two components contained within a same chip. Upon receiving an error simulation input, the hardware error-generator component modifies data being transmitted on the data path by inserting a data pattern that simulates an error condition. Alternately or additionally, the hardware error-generator randomly alters one or more of the transmitted data bits.

Although the aspects have been described in language specific to structural features and/or methodological acts, various aspects defined in the appended claims are not necessarily limited to the specific features or acts described. Rather, the specific features and acts are disclosed as example forms of implementing the various aspects.

What is claimed is:

1. A device for testing error handling, the device comprising:
    at least one error insertion circuit;
    an on-chip hardware error-generator component coupled, via the at least one error insertion circuit, to at least one data line between two sub-components in the device, the on-chip hardware error-generator component configured to:
    receive an error simulation input;
    determine a data error pattern based, at least in part, on the error simulation input; and
    insert the data error pattern, via the at least one error insertion circuit, on the at least one data line effective to generate an error condition, wherein inserting the data error pattern on the at least one data line includes tracking a phase of a data packet being transmitted over the at least one data line effective to determine when to insert the data error pattern on the at least one data line.

2. The device of claim 1, wherein the data error pattern comprises a data error pattern associated with at least one of:
    a stuck-high bit;
    a stuck-low bit;
    a random bit flip; or
    a forced error bit on the data line.

3. The device of claim 1 further comprising at least one configuration register associated with the on-chip hardware error-generator component and configured to control the data error pattern inserted by the on-chip hardware error-generator on the at least one data line.

4. The device of claim 1, wherein the on-chip hardware error-generator component is configured to modify a data packet header of a data packet transmitted on the at least one data line.

5. The device of claim 1, wherein the on-chip hardware error-generator component is further configured to randomly insert the data error pattern on the at least one data line instead of tracking the phase of the data packet being transmitted.

6. The device of claim 1, wherein the on-chip hardware error-generator component is a sub-component of an integrated circuit (IC).

7. The device of claim 1, wherein the at least one error insertion circuit comprises a hardware multiplexer (MUX).

8. A method for testing error handling, the method comprising:
    receiving, using a hardware error-generator component, an error simulation input;
    determining, using the hardware error-generator component, a data error pattern to insert on at least one digital data line coupled to the hardware error-generator component; and
    inserting, using the hardware error-generator component, the data error pattern on the at least one digital data line effective to generate an error condition, including tracking a phase of a structured data packet being transmitting on the at least one digital data line effective to determine when to insert the data error pattern on the at least one digital data line.

9. The method of claim 8, wherein inserting the data error pattern on the at least one digital data line is based, at least in part, on a clock count.

10. The method of claim 8 further comprising:
    tracking the phase of the structured data packet being transmitting on the at least one digital data line effective to identify each data field of the structured data packet as it is being transmitted on the at least one digital data line.

11. The method of claim 10, wherein the at least one field comprises a training field.

12. The method of claim 8, wherein inserting the data error pattern comprises inserting a data error pattern associated with communications between a physical (PHY) layer sub-component and a SERializer/DESerializer (SERDES) sub-component.

13. The method of claim 8, wherein inserting the data error pattern on the at least one digital data line further comprises inserting the data error pattern on the at least one data line at periodic time intervals instead of tracking the phase of the structured data packet being transmitted.

14. The method of claim 8, wherein inserting the data error pattern on the at least one digital data line further comprises interspersing the data error pattern with original data transmitted on the at least one digital data line.

15. An apparatus for testing error handling, the apparatus comprising:
    an on-chip sub-component of the apparatus operatively coupled to a data path; and
    an on-chip hardware error-generator component operatively coupled to the data path and comprising:

means for receiving error simulation input;
means for determining at least one data error pattern based, at least in part, on the error simulation input; and
means for inserting the at least one data error pattern on the data path effective to generate an error condition into the on-chip sub-component of the apparatus, wherein inserting the data error pattern on the data path comprises tracking a phase of a data packet being transmitted over the data path effective to determine when to insert the data error pattern on the data path.

16. The apparatus of claim 15, wherein the means for inserting the at least one data error pattern on the data path further comprises means for interspersing the data error pattern with data originating from a second on-chip sub-component of the apparatus.

17. The apparatus of claim 15, wherein the means for determining the at least one data error pattern further comprises means for determining timing insertion information associated with when to insert the at least one data error pattern on the data path.

18. The apparatus of claim 15, wherein the on-chip sub-component comprises a physical (PHY) layer sub-component associated with a communication protocol.

19. The apparatus of claim 15, wherein the apparatus comprises a radio frequency (RF) integrated circuit (IC) associated with a wireless modem.

20. The apparatus of claim 15, wherein the at least one data error pattern comprises a data error pattern associated with at least one of:
 a stuck-high bit;
 a stuck-low bit;
 a random bit flip;
 a forced error bit on the data path;
 a cyclic redundancy check (CRC) field error;
 a data packet header error; or
 a training sequence data error.

21. The apparatus of claim 15, wherein the means for receiving error simulation input further comprises at least one configuration register associated with the means for generating the at least one data error pattern.

22. The apparatus of claim 15, wherein the means for inserting the at least one data error pattern on the data path comprises at least one of:
 a multiplexer (MUX); or
 an eXclusive OR (XOR) gate.

23. One or more computer-readable memory devices comprising processor-executable instructions which, responsive to execution by at least one processor, perform operations to simulate on-chip error generation using one or more components of an emulated integrated circuit (IC), the operations comprising:
 receiving an error simulation input at an on-chip hardware error-generator component of the emulated IC;
 determining a data error pattern based, at least in part, on the error simulation input; and
 inserting the data error pattern on at least one data line coupled to the on-chip hardware error-generator effective to generate an error condition into a sub-component of the emulated IC that is coupled to the at least one data line, wherein inserting the data error pattern on the at least one data line comprises tracking a phase of a data packet being transmitted over the at least one data line effective to determine when to insert the data error pattern on the at least one data line.

24. The one or more computer-readable memory devices of claim 23, wherein determining the data error pattern comprises determining a data error pattern associated with at least one of:
 a stuck-high bit;
 a stuck-low bit;
 a random bit flip; or
 a forced error bit on the data line.

25. The one or more computer-readable memory devices of claim 23, wherein receiving the error simulation input comprises receiving the error simulation input via a configuration register associated with the on-chip hardware error-generator component of the emulated IC.

26. The one or more computer-readable memory devices of claim 23, wherein inserting the data error pattern on the at least one data line coupled to the on-chip hardware error-generator comprises modifying a data packet header of a data packet transmitted on the at least one data line to the sub-component of the emulated IC.

27. The one or more computer-readable memory devices of claim 26, wherein the operations to simulate on-chip error generation using one or more components of an emulated IC comprise using one or more components of an emulated baseband circuit IC.

28. The one or more computer-readable memory devices of claim 23, wherein inserting the data error pattern on the at least one data line comprises inserting the data pattern on the at least one data line at periodic time intervals instead of tracking the phase of the data packet being transmitted.

29. The one or more computer-readable memory devices of claim 23 further configured to perform operations comprising:
 receiving data input at an error-handler component of the emulated IC;
 identifying at least some corrupted data in the data input using the error-handler component; and
 responding to the at least some corrupted data using the error-handler component effective to prevent the emulated IC from halting operation.

* * * * *